US006189055B1

(12) United States Patent
Eisele et al.

(10) Patent No.: US 6,189,055 B1
(45) Date of Patent: *Feb. 13, 2001

(54) MULTI-MODULE ADAPTER HAVING A PLURALITY OF RECESSES FOR RECEIVING A PLURALITY OF INSERTABLE MEMORY MODULES

(75) Inventors: Raymund Eisele; Judith Eisele, both of Idstein (DE)

(73) Assignee: SmartDisk Corporation, Naples, FL (US)

( * ) Notice: Under 35 U.S.C. 154(b), the term of this patent shall be extended for 0 days.

This patent is subject to a terminal disclaimer.

(21) Appl. No.: 09/021,986

(22) Filed: Feb. 11, 1998

Related U.S. Application Data

(63) Continuation-in-part of application No. 08/514,382, filed on Aug. 11, 1995, now Pat. No. 6,042,009, which is a continuation-in-part of application No. 08/170,166, filed on Apr. 19, 1994, now Pat. No. 5,584,043.

(30) Foreign Application Priority Data

Jun. 26, 1991 (DE) .................................................. 41 21 023
Jun. 16, 1992 (WO) ................................... PCTEP9201356

(51) Int. Cl.$^7$ ..................................................... G06F 13/10
(52) U.S. Cl. ............................... 710/62; 710/102; 711/5; 711/115; 360/131; 365/185.17; 369/289; 369/291
(58) Field of Search .................................... 235/449, 492; 360/131; 365/185.17; 369/289, 291; 379/357; 710/62, 102; 711/115, 5

(56) References Cited

U.S. PATENT DOCUMENTS 3,700,826 * 10/1972 O'Neal .

(List continued on next page.)

FOREIGN PATENT DOCUMENTS 664 635 A5 * 3/1988 (CH) .
3534638 A1 * 5/1986 (DE) .

(List continued on next page.)

OTHER PUBLICATIONS

Stiffened Card With Integrated Circuit. IBM Technical Disclosure Bulletin, Apr. 1986;28(11):4723–4725.*
Personal Transaction Card. IBM Technical Disclosure Bulletin, Aug. 1987;30(3):1262–1265.*
Transaction Handling System Using a Bank Card With Display, Input and Memory Functions. IBM Technical Disclosure Bulletin Nov. 1985;28(6):2568–2570.*
Sippl CJ. Microcomputer Dictionary–Second Edition, 1981. Cat. No. 62–2311, Radio Shack. p. 349.*
Dip.–Ing. Roland Vogt. Intelligenz im Scheckkartenformat:IC–Cards—neue Aspekte der Informationsverarbeitung.Elektronik 19/19.19.1986:99–101.*

*Primary Examiner*—Thomas C. Lee
*Assistant Examiner*—Thuan Du
(74) *Attorney, Agent, or Firm*—Nixon & Vanderhye P.C.

(57) ABSTRACT

An adapter which can be plugged into a floppy disk drive of a computer can receive a plurality of user insertable and removable memory modules therein and provide access to the memory modules by the computer for reading and/or writing thereto. The adapter has a frame having an exterior form designed to be insertable into a floppy drive and accommodate the plurality of modules. The frame houses interface circuitry for facilitating the transferring of data between the adapter and a read/write head of a floppy disk drive. The adapter provides a plurality of recesses with contacts for coupling with corresponding contacts of memory modules when inserted therein, providing a path for transferring data to and from the modules. The frame may also accommodate a battery and/or a generator/alternator and associated regulator circuitry 14 (see FIG. 2*a*) for supplying current to the adapter circuitry and the memory modules.

6 Claims, 1 Drawing Sheet

U.S. PATENT DOCUMENTS

| | | | | |
|---|---|---|---|---|
| 3,940,758 | * | 2/1976 | Margolin . | |
| 3,946,156 | * | 3/1976 | Budrose . | |
| 3,978,524 | * | 8/1976 | Gordon et al. . | |
| 4,034,164 | * | 7/1977 | Westmoland . | |
| 4,228,474 | * | 10/1980 | Neal, Jr. . | |
| 4,446,519 | * | 5/1984 | Thomas . | |
| 4,504,871 | * | 3/1985 | Berwick et al. . | |
| 4,575,621 | * | 3/1986 | Dreifus . | |
| 4,656,533 | * | 4/1987 | Sakai et al. . | |
| 4,672,182 | * | 6/1987 | Hirokawa . | |
| 4,701,601 | * | 10/1987 | Francini et al. . | |
| 4,734,897 | * | 3/1988 | Schotz . | |
| 4,755,883 | * | 7/1988 | Uehira . | |
| 4,758,718 | * | 7/1988 | Fujisaki et al. . | |
| 4,769,764 | * | 9/1988 | Lavanon . | |
| 4,774,618 | * | 9/1988 | Raviv . | |
| 4,791,283 | * | 12/1988 | Burkhardt . | |
| 4,814,924 | * | 3/1989 | Ozeki . | |
| 4,817,136 | * | 3/1989 | Rhoads | 379/357 |
| 4,860,128 | * | 8/1989 | Nakagawa . | |
| 4,868,373 | * | 9/1989 | Ophij et al. . | |
| 4,891,727 | * | 1/1990 | Sato et al. . | |
| 4,935,962 | * | 6/1990 | Austin . | |
| 4,951,249 | * | 8/1990 | McClung et al. . | |
| 4,959,861 | * | 9/1990 | Howlette . | |
| 4,965,691 | * | 10/1990 | Iftikar et al. . | |
| 5,015,830 | * | 5/1991 | Masuzawa et al. . | |
| 5,044,798 | * | 9/1991 | Roylance et al. . | |
| 5,050,020 | * | 9/1991 | Campbell et al. . | |
| 5,055,947 | * | 10/1991 | Satoh . | |
| 5,068,894 | * | 11/1991 | Hoppe . | |
| 5,107,099 | * | 4/1992 | Smith | 235/449 |
| 5,159,182 | * | 10/1992 | Eisele . | |
| 5,204,663 | * | 4/1993 | Lee . | |
| 5,208,802 | * | 5/1993 | Suzuki et al. | 369/289 |
| 5,224,216 | * | 6/1993 | Gordon et al. . | |
| 5,227,615 | * | 7/1993 | Oogita . | |
| 5,237,551 | * | 8/1993 | Ogawa et al. . | |
| 5,267,311 | * | 11/1993 | Bakhoum . | |
| 5,276,317 | * | 1/1994 | Ozouf et al. . | |
| 5,296,692 | * | 3/1994 | Shino . | |
| 5,321,817 | * | 6/1994 | Feinstein . | |
| 5,331,627 | * | 7/1994 | Childers et al. | 369/291 |
| 5,338,923 | * | 8/1994 | Grieu . | |
| 5,406,064 | * | 4/1995 | Takahashi . | |
| 5,423,054 | * | 6/1995 | Schmidt et al. . | |
| 5,434,737 | * | 7/1995 | Miura . | |
| 5,465,381 | * | 11/1995 | Schmidt et al. . | |
| 5,471,038 | * | 11/1995 | Eisele et al. . | |
| 5,473,765 | * | 12/1995 | Gibbons et al. . | |
| 5,486,687 | * | 1/1996 | Le Roux . | |
| 5,497,464 | * | 3/1996 | Yeh . | |
| 5,541,985 | * | 7/1996 | Ishii et al. . | |
| 5,550,709 | * | 8/1996 | Iwasaki . | |
| 5,568,441 | * | 10/1996 | Sanemitsu . | |
| 5,584,043 | * | 12/1996 | Burkart . | |
| 5,590,306 | * | 12/1996 | Watanabe et al. | 711/115 |
| 5,635,701 | * | 6/1997 | Gloton . | |
| 5,638,321 | * | 6/1997 | Lee et al. | 365/185.17 |
| 5,663,553 | * | 9/1997 | Aucsmith . | |
| 5,664,228 | * | 9/1997 | Mital . | |
| 5,714,742 | * | 2/1998 | Ieda . | |
| 5,802,544 | * | 9/1998 | Combs et al. | 711/5 |
| 5,844,757 | * | 12/1998 | Rose | 360/131 |
| 5,887,145 | * | 3/1999 | Harari et al. | 710/102 |
| 5,936,226 | * | 8/1999 | Aucsmith | 235/492 |

FOREIGN PATENT DOCUMENTS

| | | | |
|---|---|---|---|
| 3528199 C2 | * | 2/1987 | (DE) . |
| 3701114 A1 | * | 8/1987 | (DE) . |
| 87 09 268 u | * | 10/1987 | (DE) . |
| 3903454 A1 | * | 6/1990 | (DE) . |
| 4036336 A1 | * | 5/1992 | (DE) . |
| 0 178 805 A3 | * | 4/1986 | (EP) . |
| 0 328 124 A2 | * | 8/1989 | (EP) . |
| 0 373 411 A2 | * | 1/1990 | (EP) . |
| 059983 | * | 12/1992 | (EP) . |
| 403141486 | * | 10/1989 | (JP) . |
| 403194680 | * | 12/1989 | (JP) . |
| 2-161670 | * | 6/1990 | (JP) . |
| 404205079 | * | 11/1990 | (JP) . |
| 3-30007 | * | 2/1991 | (JP) . |
| 3-233790 | * | 10/1991 | (JP) . |
| WO89/12288 | * | 12/1989 | (WO) . |
| WO 90/04847 | * | 5/1990 | (WO) . |
| WO 93/00658 | * | 1/1993 | (WO) . |
| WO 93/07555 | * | 4/1993 | (WO) . |

* cited by examiner

FIG. 1a
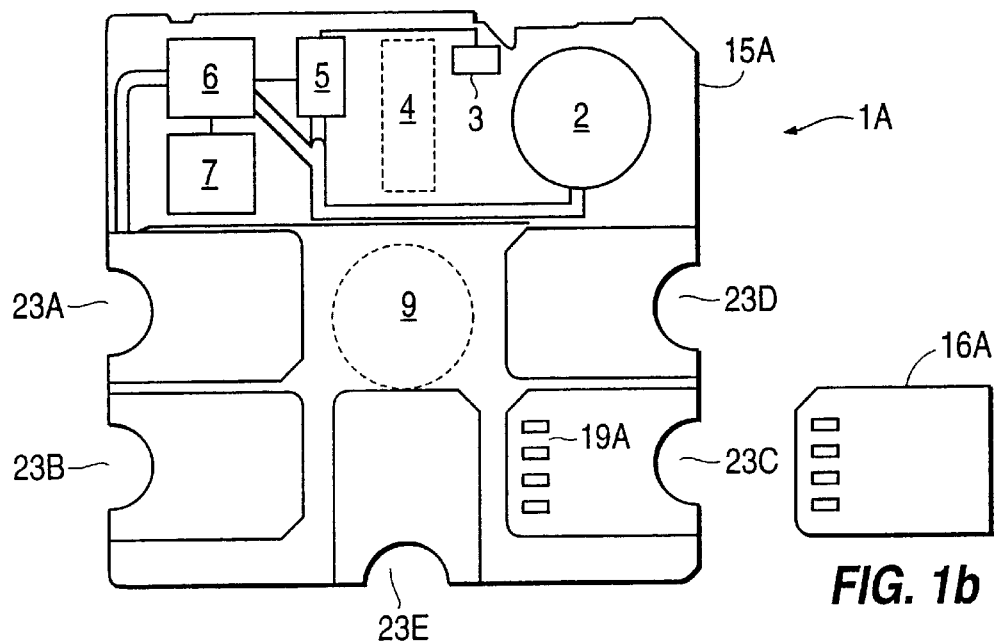
FIG. 1b
FIG. 2a
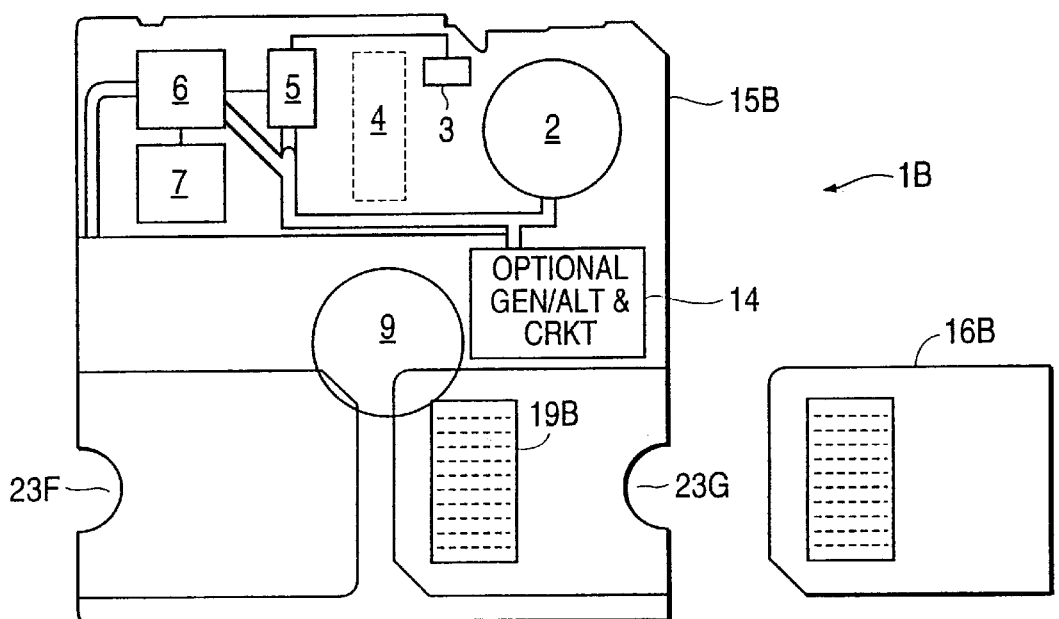
FIG. 2b

MULTI-MODULE ADAPTER HAVING A PLURALITY OF RECESSES FOR RECEIVING A PLURALITY OF INSERTABLE MEMORY MODULES

CROSS-REFERENCE TO RELATED APPLICATIONS AND PATENTS

This application is related as a continuation-in-part of commonly owned application Ser. No. 08/514,382, now U.S. Pat. No. 6,042,009, filed Aug. 11, 1995, entitled "POCKET INTERFACE UNIT (PIU) FOR A SMART-DISKETTE", which is a continuation-in-part of commonly owned application Ser. No. 08/170,166, filed Apr. 19, 1994, now U.S. Pat. No. 5,584,043 (Burkart and Eisele), the subject matter of which are hereby incorporated by reference.

This application is also related to the following commonly owned applications and patents:

application Ser. No. 09/184,350, filed Nov. 2, 1998, still pending, entitled "HOME POINT-OF-SALE (POS) TERMINAL";

application Ser. No. 09/092,003, now U.S. Pat. No. 5,988,512, filed Jun. 5, 1998, entitled "SMART DATA STORAGE DEVICE"; which is a continuation-in-part of application Ser. No. 08/420,796, still pending;

application Ser. No. 09/086,677, filed May 29, 1998, still pending, entitled "SMART-CARD AND MEMORY MODULE ADAPTER";

application Ser. No. 09/013,036 filed Jan. 26, 1998, still pending entitled "ADAPTER", hereby incorporated by reference;

application Ser. No. 08/420,796 filed Apr. 12, 1995, still pending entitled "SMART DATA STORAGE DEVICE" which is a continuation of Ser. No. 07/947,570 (abandoned), which is a continuation of Ser. No. 07/448,093, now U.S. Pat. No. 5,159,182, hereby incorporated by reference;

U.S. Pat. No. 5,471,038 entitled "SMART-DISKETTE READ/WRITE DEVICE HAVING FIXED HEAD";

application Ser. No. 08/479,747 filed Jun. 7, 1995, still pending, entitled "COMMUNICATION INTERFACE ELEMENT RECEIVABLE INTO A MEDIA DRIVE" which is a continuation of Ser. No. 07/712,897, now U.S. Pat. No. 5,457,590, hereby incorporated by reference; and application Ser. No. 08/867,496, now U.S. Pat. No. 6,089,459, filed Jun. 2, 1997, entitled "SMART-DISKETTE DEVICE" (allowed) hereby incorporated by reference.

BACKGROUND OF THE INVENTION

1. Field of The Invention

The present invention relates generally to the field of computer devices, and in particular, to an adapter element in the shape of a diskette for insertion into a floppy disk drive, which is designed to receive a plurality of memory modules or cards therein.

2. Background Information

There is known a so-called "smart-diskette," which is a device having the external shape of, for example, a standard 3½ inch diskette, and which contains therein, instead of and/or in addition to a magnetic medium (disk), interface and processing circuitry for providing particular functionality to the device. The known smart-diskette circuitry includes an interface for transferring data between other components provided on the device and/or inserted into the device, and a magnetic head of a standard floppy disk drive into which the device can be inserted. In various forms, the smart-diskette device may include a microprocessor for controlling the device and performing various tasks, such as data encryption. On-board memory may be provided as well in the form of, for example, RAM (random access memory), ROM (read only memory), EEPROM (electronically erasable/programmable read only memory), and/or Flash memory, for storing programs and data. The device circuitry may be provided in the form of discrete components or an application specific integrated circuit (ASIC).

U.S. Pat. No. 5,159,182, and copending application Ser. No. 08/420,796 still pending, disclose embodiments of a smart-diskette insertable element with magnetic interface, processor, power supply and optional display and keypad, designed to be inserted into a standard 3½ inch floppy disk drive of a host computer, i.e., electronic data processing (EDP) equipment, such as a desk-top personal computer (PC) or notebook computer, for example.

An exemplary embodiment of the smart-diskette insertable element disclosed in the above-mentioned patent and application, has a processor with some built-in program/data memory, additional memory for storing data and/or programs, and an interface designed to facilitate the exchange of data between the device and a floppy disk drive read/write head. A driver and coil of the interface convert signals from the processor into the required magnetic form and provide them to the read/write head of a floppy disk drive, and likewise convert signals received from the floppy disk drive read/write head into the required form for use by the processor.

A significant advantage of the smart-diskette insertable element is that, by virtue of its insertability into the standard, ubiquitous, floppy disk drive, and interfaceability therewith, it is possible to carry-out a variety of operations with the processor and/or memory on the element. These include but are not limited to encryption and decryption of data and/or verification of user identity. Such operations are accomplished without requiring any specially designed interface or plug-in boards which might be suitable only for use with a limited number of computer systems. Another advantageous feature of the smart-diskette insertable element is its ability to store additional data and/or programs in on-board and/or add-on memory connected with the on-board processor. This considerably increases the potential areas of application for the element.

The smart-diskette element disclosed in the above patent and application, may be equipped with a battery power source supplying power to the electronic components within the element, and/or a generator/alternator, with associated regulator circuitry, driven by the rotation of a floppy disk drive spindle.

As mentioned, the interface of the smart-diskette insertable element is designed to allow data to be exchanged with the read/write head of a floppy disk drive, and one way this can be achieved is by locating an electromagnetic component on the element, e.g., one or more coils, to be in the vicinity of the read/write head of the floppy disk drive when the element is inserted into the drive, and which generates magnetic field information equivalent to that generated by a magnetic disk of a standard floppy diskette. In this way, the interface simulates a magnetic floppy diskette. This property of the interface allows data to be transferred under control of the on-board processor to the EDP, e.g., data which enables user identification to be verified, thereby providing security to the EDP equipment, or any of a number of other operations, as would be recognized by one skilled in the art. As processor capabilities expand and memory devices with increasing capacity become smaller, the smart-diskette takes on the potential for more and more useful applications.

Related U.S. Pat. No. 5,471,038 discloses a read/write unit with a read/write head and optional electrical contacts, but without the standard disk driving and head moving parts, for use in a desk-top PC or notebook computer to communicate with a smart-diskette. By eliminating the drive motor and moving read/write heads, a significant amount of energy which would otherwise expended by the use of such moving parts is conserved.

Further, such a read/write unit, since it eliminates bulky drive and head motors, can be made more compact than a standard floppy disk drive, thereby reducing the overall size and weight requirements for the computer in which it is installed.

Related copending application Ser. No. 08/514,382 discloses a pocket interface unit (PIU) for use with a smart-diskette. Pocket calculators and diary devices are known and gaining acceptance with busy executives, for example. However, such devices have numerous limitations and disadvantages. For example, although such devices can interface with a desk-top computer to download application programs and/or data, for example, or to upload data entered on the pocket device to the desk-top computer, to do so currently requires inconvenient cabling, and/or a special interface unit, e.g., PCMCIA, with associated costs. Some devices use infra-red beams to communicate between the device and the PC, but these are subject to atmospheric and distance limitations, or may be subject to errors due to dust or dirt on a lens, for example.

In addition, such pocket devices are generally limited to a single special application, such as a phone directory, or a golf-handicap calculator, and do not generally provide the range of capabilities of a notebook computer, for example. Pocket-sized pagers and cellular telephones are also known. However, these respective devices do not generally have the capability of functioning as anything except a pager or telephone, that is, they are generally devices which are dedicated to a single function. Therefore, the fully-equipped, fully-functional executive may be burdened by having to carry around a variety of separate devices, which further disadvantageously cannot readily interface with one another.

The PIU, disclosed in the copending application, for use with a smart-diskette, overcomes these and other problems, as well as providing other advantages over the prior art.

Related U.S. Pat. No. 5,584,043 discloses a smart-diskette adapted to receive at least one memory and/or processor card, such as an ATM, patient information, or bank debit card, FlashPROM card, or the like. For example, FIG. 5a of the patent illustrates an embodiment adapted for receiving at least one mini-chip card. This disclosed device could be used with the recently developed MMC (MultiMediaCard made by Siemens/SanDisk), or the SSFDC also called a SmartMediaCard (SMC, made by Toshiba).

The so-called MultiMediaCards (MMCs) provide small, transportable audio/video media storage in the form of a card substrate carrying a memory, and an optional processor in some cases, which can be inserted into a number of different media recording/playback devices specifically adapted to receive the MMCs. The MMC memory currently can store, for example, about 8 megabytes of digitized video and/or audio signals. Typically, contacts on the MMC are be used to connect and transfer the digitized video/audio to a media recorder or playback device.

However, if it was desired to load such data onto an MMC from a personal computer or vice versa, until the advent of the smart-diskette embodiment disclosed in the above mentioned patent, which is adapted to receive at least one memory card, such as an MMC, a special add-on device would have been required.

A variety of so-called Flash memory devices (FlashPROMs) have also become known and are more and more widely used, for example, in digital cameras. The above-mentioned MMCs may use Flash memory or any other type of non-volatile memory. However, presently, FlashPROMs typically have a capacity of only about 8 megabytes each, which may limit their usefulness under some circumstances, e.g., for application when more storage capacity is required.

As mentioned, to make full use of the MMCs as proposed, until now, a user would need an entirely new recording/playback device designed with a port for interconnecting with the MMCs to make use of them in their home. In other words, the existing conventional user playback/recording equipment does not generally interface with the newly developed MMCs.

Therefore, a need existed for an adapter device which could permit use of the new MMCs with the existing conventional electronic equipment, such as home/auto recording/playback equipment. Related copending application Ser. No. 09/013,036, still pending meets this need and discloses an adapter for use in adapting a conventional cassette tape playback/recording device with a plurality of Flash memory devices, MMCs, or the like, which store digitized audio, for example. The adapter provides a way of adapting one or more MMCs to conventional recording playback devices, such as a conventional audio or video cassette player. The adapter inserted into a conventional tape device interfaces the tape device with one or more removable storage circuits (e.g., MMCs) which store digital audio and/or video data. By accommodating a number of MMCs at once, a user can advantageously record and/or playback an extended audio or visual work with the adapter.

Of course, MMCs, Flash-memory devices, and the like, can be put to other uses besides storing audio and/or video/image data for use in a home or automobile system. They can be used to store any type of digital data imaginable. However, the inventive adapter disclosed in the copending application is in the form of a tape cassette, i.e., audio, video, or digital (e.g., DAT). While digital tape drives are available as relatively expensive add-on devices for personal computers, these tape drives are not as ubiquitous as the floppy disk drive which are provided with practically every personal computer as a standard feature.

In view of the above background information, to take further advantage of some of the possibilities of MMCs, Flash-memory devices, and the like, and to overcome problems in the art, the inventors have invented the improved adapter described in detail below.

SUMMARY OF THE INVENTION

It is, therefore, a principle object of this invention to provide an improved smart-diskette adapter, in particular, a SmartMultiAdapter (a trademark of SmartDiskette GmbH, Idstein, Germany, all rights reserved) which provides advantages over the prior art and solves the problems in the prior art.

It is, therefore, a further principle object of this invention to provide a method and apparatus for adapting a plurality of memory modules (e.g., MMCs) to a commonly used personal computer storage and retrieval device, such as a conventional 3½ inch floppy disk drive. The term memory modules as used herein refers to modules having at least memory, and perhaps an optional processor in some cases.

It is another object of the invention to provide a method and apparatus that solves the above mentioned problems so that the purchase of additional costly recording/playback equipment to use such memory modules, e.g., MMCs, with a personal computer, or the like, is unnecessary.

According to an aspect of the invention, up to 5 MMCs can be inserted at once into respective sockets on an adapter according to the invention. Two modules are insertable at the left edge of the adapter, two at the right of the adapter, and one at the rear (outer) edge of the adapter. The adapter with one or more memory modules is insertable into a floppy disk drive front edge (inner edge) first.

According to another aspect of the invention, the adapter provides for playback of music and/or image data, for example, from one or more memory modules, via the floppy disk drive of a personal computer.

According to another aspect of the invention, music and/or image data, for example, can be recorded on one or more memory modules via the personal computer floppy disk drive.

These and other objects of the present invention are accomplished by the method and apparatus disclosed herein.

BRIEF DESCRIPTION OF THE DRAWINGS

The above and other features and advantages of the invention will become apparent from the following detailed description taken with the drawings in which:

FIG. 1a is a schematic illustration of an exemplary embodiment of the invention for use with MMC modules;

FIG. 1b is an illustration of an MMC module to be used with the adapter of FIG. 1a;

FIG. 2a is a schematic illustration of an exemplary embodiment of the invention for use with SSFDC/SMC modules; and FIG. 2b is an illustration of an SSFDC/SMC module to be used with the adapter of FIG. 2a.

DETAILED DESCRIPTION OF PREFERRED EMBODIMENTS

The invention will now be described in more detail by example with reference to the embodiments shown in the Figures. It should be kept in mind that the following described embodiments are only presented by way of example and should not be construed as limiting the inventive concept to any particular physical configuration.

FIG. 1a shows an exemplary embodiment of the invention, generally indicated as 1A. In particular, an insertable frame 15A, in the shape and size of a floppy diskette housing, houses one or more batteries 2, magnetic interface (e.g., a coil) 3 which is in or adjacent to slot 4, and a driver/converter (A/D-D/A) 5. The magnetic interface 3 at slot 4 is arranged to magnetically couple with the read/write head of a floppy disk drive (not shown) when the adapter is inserted therein, to permit the exchange of data therewith. The driver/converter 5 converts digital data signals from the processor 6 into an analog signal form typically used by floppy disk drives (MFM) and drives the magnetic interface 3 therewith. The driver/converter 5 likewise converts analog signals picked-up by the magnetic interface 3 from the read/write head into digital form for use by the processor 6.

The processor 6 is coupled to on-board memory 7, which may contain programs and/or data and provides storage which can be used by the processor 6 in carrying out its operations. The processor 6 could be a Motorola 6805, or the like, for example. The one or more batteries 2 provide power to the adapter components. A spindle recess 9 is provided on the frame 15A which accommodates a floppy disk drive spindle when the adapter 1A is inserted in a drive. An optional generator or alternator and associated regulator circuitry 14 (shown in FIG. 2a) could be provided on-board which would be driven by the floppy disk drive spindle in use to provide a recharging of the one or more batteries 2.

A number of recesses 23A–E are provided in the frame 15A, and contacts 19A are disposed therein for providing connection between the processor 6 and a respective memory module inserted therein. FIG. 1b shows a memory module 16A which has corresponding contacts thereon. Although four contacts are shown for illustration purposes, this number may vary depending on the memory module and adapter. Three contacts would probably be sufficient to provide power, ground and signal in the most rudimentary case. However, some contacts to provide address lines, control lines, and the like, are possible. The contacts are illustrated in a line, however other configurations are possible. In short, the number, configuration and function of the contacts is dependent on the type of memory module used, and the invention is not limited to any particular number or configuration or function.

Lines from the contacts 19A in each of the recesses 23A–E are routed to the processor 6. As one skilled in the art would realize, depending on the memory modules used, data may output from the memory modules in serial or parallel form, and this could be by separate dedicated data and/or address and/or control lines, or a shared bus structure. The lines from the contacts could be multiplexed by the addition of a multiplexer, for example. Such details are within the scope of knowledge of those skilled in the art, and as such, need not be described here in detail. The invention is not intended to be limited to any particular memory module or data communication protocol.

The user removable memory modules 16A may comprise only memory, e.g., Flash-memory, and connectors, i.e., there may be no significant processor power on the module 16A itself. As known in the art, some types of memory modules may contain a rudimentary state machine logic for handling addressing of memory cells therein, for example, while others may have on-board more significant processing capabilities, for handling addressing, refreshing, etc.

Further, the removable memory modules 16A could be, for example, the type that are typically used in digital cameras. Since the insertable frame 15A is designed to fit into a personal computer (PC) floppy disk drive, e.g., a 3½ inch floppy disk drive, pictures taken with a digital camera and stored on a removable memory module 16A could thus be transferred to a personal computer for editing and the like. The picture data so transferred may appear to the computer user as standard a JPEG (compressed) picture format file, for example, on a standard floppy diskette. The user can access the pictures from the removable memory module 16A using the standard disk operations of the operating system of the PC. The user can, for example, read or write to the memory, get a directory of the pictures on the memory device, copy, delete, and view with a standard PC picture viewer, etc., just as if using a standard floppy diskette. An individual insertable memory module currently may store on the order of 2 to 16 megabytes. However, with the adapter 1A, which accommodates up to 5 modules, has an overall storage capacity which is multiplied by 5. This is advantageous for storing relatively long audio and/or visual passages, for example.

Processor 6 could be programmed to perform compression and decompression of data so that memory is used more efficiently. Encryption and decryption of private and/or sensitive data is an option as well. Where transmitting data over public telephone lines may pose a security risk, the adapter 1A could be useful to encrypt and store such data in memory modules 16A which can then be transported in a relatively small package to a remote site for decryption through another adapter 1A. The data can be password protected through interaction between the on-board processor 6 in the adapter 1A and a personal computer.

As mentioned, besides pictures, audio and multimedia data can be conveniently transferred to and from a PC using this adapter 1A with memory modules 16A. Further, the memory modules 16A could be used to provide a backup of important hard disk data, or to transfer data from one PC to another, as would be apparent to one skilled in the art.

The adapter 1A could be used to store to memory modules 16A data, including audio and/or visual information, obtained from the Internet by a personal computer, for example.

Phone numbers and names stored on a personal computer address book could be transferred to the memory modules 16A with the adapter 1A, and then used in a cellular phone, or other telephone communication device, adapted to receive memory modules 16A. Virtually any sort of data stored in a personal computer could be transferred to memory modules 16A with the adapter 1A, and conveniently transferred to another device.

Since an adapter 1A with 5 modules 16A therein may hold over 40 megabytes of data uncompressed, such an arrangement may be used to conveniently transport personal data files, i.e., spreadsheets, word-processor documents, database files, and the like, thus eliminating the need of carrying an expensive and fragile laptop computer having a hard disk drive storing such data thereon. One or more such adapters 1A with modules 16A could be conveniently and safely carried and then used in another personal computer at a remote destination. Since the data is stored in non-volatile memory, it is more safely carried through airport metal detectors and the like, than ordinary floppy disks which can be accidentally erased by such machines. Further, they are not subject to scratching like conventional compact disks, for example.

As mentioned above, digital images can be stored in the memory modules 16A, either from a PC or from a digital camera device, such as Intel's 971 PC camera or the Polaroid PDC 300, for example. When placed in an adapter 1A, such images can be transferred to another PC anywhere in the world over the Internet.

Under the control of an application program, when used the first time, a unique number can be assigned to each memory module 16A and stored therein. The application program further keeps track of what files are stored on which module 16A and this information can be stored on the respective module 16A as an index or directory. The index/ directory can later be read by another application program so that the desired data can be accessed. This can all be handled according to standard disk operating system (DOS) parameters and formats, or can be handled in a non-standard as an additional way to prevent unauthorized access to the data.

FIG. 2a shows just one of many possible alternate embodiments, in particular, an embodiment designed for use with 2 SSFDCs 16B (i.e., SmartMediaCards—SMCs), which have a larger external size and use different interconnecting contacts 19B. In this illustrated embodiment, only two recesses 23F–G are provided due to space constraints.

(Note that although it may appear so from the schematic drawing of FIG. 2a, the modules 16B would not actually extend into the space of spindle recess 9, at least not to a point where they interfered with a floppy disk drive spindle.)

It will be understood that the above description of the present invention is susceptible to various modifications, changes and adaptations, and the same are intended to be comprehended within the meaning and range of equivalents of the appended claims.

What is claimed is:

1. An adapter for insertion into a floppy disk drive, comprising:

a frame having the external shape of a floppy diskette and having a plurality of recesses for accommodating a respective plurality of insertable memory modules;

interface circuitry housed in the frame which provides an interface between a read/write head of a floppy disk drive and memory modules when inserted in the recesses;

wherein the plurality of recesses are adapted to receive at least one of a plurality of memory modules, the plurality of memory modules including:
multi-media cards (MMCs); and
smart media cards;

wherein the interface circuitry includes respective contacts disposed in respective ones of the plurality of recesses which couple with corresponding respective contacts on respective memory modules when inserted in the respective recesses, and a magnetic interface which is adapted to magnetically couple with a read/write head of a floppy disk drive when the adapter is inserted in the floppy disk drive;

a processor, coupled to the contacts, which is operable to receive and transmit signals to and from respective memory modules through the respective contacts, and to receive and transmit signals to and from the magnetic interface;

a memory connected to the processor which stores data and/or programs used by the processor;

wherein the magnetic interface comprises a magnetic transducer which is operable to send and receive magnetic signals to and from a floppy disk drive read/write head, and a driver/converter connected to the transducer and the processor which is operable to convert signals from the transducer to a form useful to the processor, convert signals from the processor to a form used by a floppy disk drive, and to drive the transducer with the converted signals from the processor;

further comprising at least one battery which is connected to provide power to the interface circuitry and memory modules; and electrical energy producing means, coupled to the at least one battery, in the form of one of:
a generator driveable by a floppy disk drive spindle; and
an alternator driveable by a floppy disk drive spindle.

2. The adapter according to claim 1, wherein the frame has the shape and size of a 3½ inch floppy diskette.

3. The adapter according to claim 1, wherein the recesses are adapted for MMCs, and wherein there are provided five recesses on the frame.

4. The adapter according to claim 1, wherein the recesses are adapted for smart media cards, and wherein there are provided two recesses on the frame.

5. The adapter according to claim 1, wherein the processor includes programming to perform at least one of:
   encryption of data;
   decryption of data;
   compression of data; and
   decompression of data.

6. The adapter according to claim 1, wherein the processor includes programming to perform interactive password checking to verify authorized use of the adapter and/or the memory modules.

* * * * *